(12) United States Patent
Edwards et al.

(10) Patent No.: US 7,508,009 B2
(45) Date of Patent: Mar. 24, 2009

(54) ELECTROCHROMIC DEVICE BASED ON NANOCRYSTALLINE MATERIALS

(75) Inventors: Marten Edwards, Oppsala (SE); Anders Hagfeldt, Björklinge (SE); Gerrit Boschloo, Uppsala (SE); Sten-Erik Lindqvist, Uppsala (SE)

(73) Assignee: Ntera, Ltd., Radnor, PA (US)

( * ) Notice: Subject to any disclaimer, the term of this patent is extended or adjusted under 35 U.S.C. 154(b) by 46 days.

(21) Appl. No.: 10/343,718

(22) PCT Filed: Aug. 2, 2001

(86) PCT No.: PCT/SE01/01696

§ 371 (c)(1),
(2), (4) Date: Jun. 4, 2003

(87) PCT Pub. No.: WO02/12954

PCT Pub. Date: Feb. 14, 2002

(65) Prior Publication Data

US 2005/0104136 A1    May 19, 2005

(51) Int. Cl.
*H01L 33/00* (2006.01)

(52) U.S. Cl. .......................................... 257/103; 257/13

(58) Field of Classification Search ................... 257/13, 257/103
See application file for complete search history.

(56) References Cited

U.S. PATENT DOCUMENTS

| | | | |
|---|---|---|---|
| 4,498,739 A | 2/1985 | Itaya et al. | |
| 5,876,581 A | 3/1999 | Itaya et al. | |
| 6,067,184 A * | 5/2000 | Bonhote et al. | 359/265 |
| 2002/0177032 A1 * | 11/2002 | Suenaga et al. | 429/44 |
| 2005/0196672 A1 * | 9/2005 | Mukherjee et al. | 429/218.1 |

FOREIGN PATENT DOCUMENTS

WO    WO 01/27690 A2    4/2001

OTHER PUBLICATIONS

Bonhote, P., et al., Nanocrystalline Electrochromic Displays, Laboratoire de Photonique et Interfaces, Departement de chimie, Ecole Polytechnique Federale de Lausanne, CH-1015 Lausanne, Switzerland, Received Jan. 20, 1999 pp. 137-144.

Itaya, K., et al. Spectroelectrochemistry and Electrochemical Preparation Method of Prussian Blue Modified Electrodes, J. Am. Chem. Soc. 1982, 104, 4767-4772, pp. 4767-4772.

Hagfeldt, et al., Nanostructured TiO2 Semiconductor Electrodes Modified With Surface Attached Viologens: Applications for Displays and Smart Windows, Institut de Chimie Physique, Ecolo Polytechnique Federale de Lausanne, CH-1015 Lausanne Switzerland, SPIE Vo. 2531 pp. 60-69.

Bach et al., Nanomaterials-Based Electrochromics for Paper-Quality Displays, Adv. Mater. 2002, 14, No. 11, Jun. 5.

* cited by examiner

*Primary Examiner*—Long Pham
(74) *Attorney, Agent, or Firm*—Morgan Lewis & Bockius LLP

(57) ABSTRACT

An electrochromic device, comprising a first electrode (3), a second electrode (5) and an electrolyte (4) separating the electrodes (3, 5), where at least one of said first and second electrodes includes an electrically active structure which have an at least dual state visual appearance depending on the potential difference between the first and the second electrode.

12 Claims, 1 Drawing Sheet

ELECTROCHROMIC DEVICE BASED ON NANOCRYSTALLINE MATERIALS

TECHNICAL FIELD OF THE INVENTION

Figure 1:
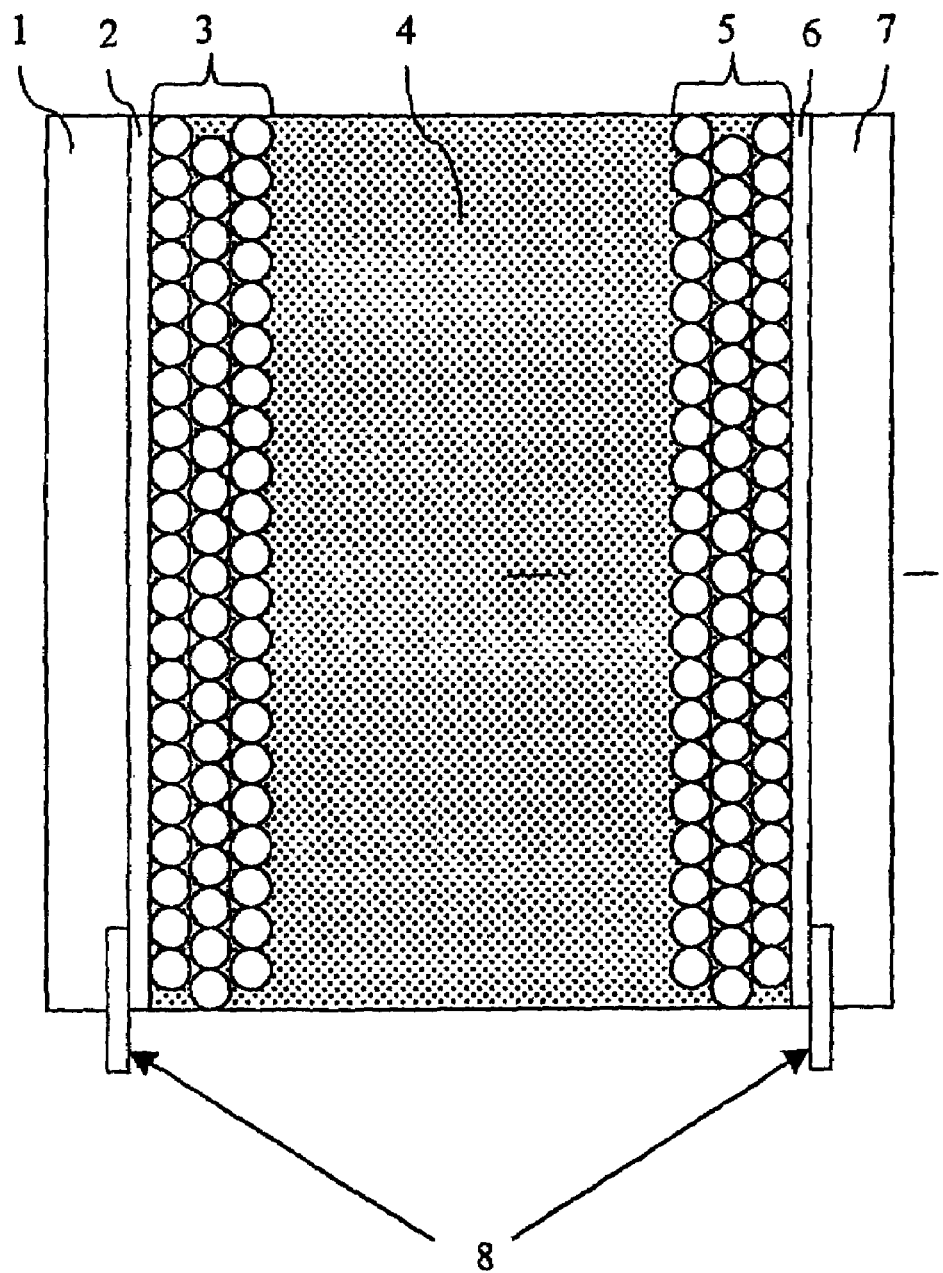

The present invention relates to an electrochromic device and a method for change of state of an electrically active structure in an electrochromic device. The invention relates more specifically to an electrochromic device comprising at least one nanostructured electrode which does not have an redox active species added to the surface.

TECHNICAL BACKGROUND

Available electrochromic devices may be divided into at least four classes:

Firstly, there are devices based on ion insertion reactions at essentially dense metal oxide electrodes. To ensure the desired change in transmittance needed to bring about a color change, a certain number of ions must be intercalated into the electrode to compensate for the accumulated charge. However, since the surface area in contact with the electrolyte is not significantly larger than the geometric area of the electrode, the use of metal oxide electrodes requires bulk intercalation of ions. As a consequence, the switching times of such a device are typically of the order of tens of seconds. The charge required for the coloration is counterbalanced by oxidation of a redoxcomponent, such as ferrocene or the like, in the electrolyte at the counter electrode, or by oxidation of a $NiO_xH_y$ film on the counter electrode.

In U.S. Pat. No. 4,561,729 an electrochromic indicating device of this type is presented, which comprises a counter electrode comprised of activated carbon. This counter electrode counterbalances the charge required for the coloration of a coloring electrode of intercalation type by capacitive charging. In U.S. Pat. Nos. 5,940,202 and 5,708,523, similar electrochromic devices are shown, each comprising a porous carbon counter electrode, which is formed in a linear pattern and a dotted pattern, respectively.

Secondly, there are solution-phase electrochromic devices, in which one or two electrochromic compounds are dissolved in an electrolyte between two electrodes. Such systems are disclosed in U.S. Pat Nos. 4,902,108 and 5,128,799, wherein a molecule which colors by reduction and another one which colors by oxidation are present in the solution. The application of a voltage over the electrodes then results in the reduction of the former substance at the cathode and oxidation of the later at the anode. Systems of this type are not bistable and therefore bleach spontaneously when the current is off.

Thirdly, there are devices based on a transparent conducting substrate coated with a polymer to which a redox chromophore is bound. On applying a sufficiently negative potential there is a transmittance change due to formation of the reduced form of the redox chromophore. To ensure the desired change in transmittance a sufficiently thick polymer layer is required, the latter implying the absence of an intimate contact between the transparent conducting substrate and a significant fraction of the redox chromophores in the polymer film. As a consequence the switching times of such a device are, as for the first type discussed above, typically of the order of tens of seconds.

Fourthly, there are devices wherein at least one of the electrodes comprises a (semi-) conducting nanocrystalline film. The nanocrystalline coloring electrode is in this case formed of a metal oxide which carries a monolayer of adsorbed electrochromophoric molecules. These molecules comprise firstly an attachment group and secondly an electrochromophoric group, which do not absorb visible light in the oxidized state, but does absorb light in the reduced state (type n electrochromophore). More in detail, the extinction associated with the reduction of one type n electrochromophore is in the order of a magnitude higher than that of one electron in the nanostructured metal oxide. Further, due to the nanoporous structure and associated surface roughness of the nanocrystalline films used, the redox chromophore is effectively stacked as in a polymer film, while at the same time maintaining the intimate contact with the metal oxide substrate necessary to ensure rapid switching times. Alternatively, the electrochromophoric group may be a type p electrochromophore, whereby it exhibits a reverse behavior, i.e. it does absorb light in the oxidized state, but it does not absorb light in the reduced state. More generally, the electrochromophoric group may have two or more oxidation states with different colours. In such cases it is not possible to classify the electrochromophore as n-type or p-type.

A "nanocrystalline film" is constituted from fused nanometer-scale crystallites. In a "nanoporous-nanocrystalline" film the morphology of the fused nanocrystallites is such that it is porous on the nanometer-scale. The porosity of a nanostructured film is typically in the range of 50-60%, and the particle size is typically within the range of from a few nanometers up to several hundred nanometers in at least two dimensions (i.e the particles may be shaped as spheres, rods, cylinders e.t.c.). The thickness of a nanostructured film is typically in the order of 5-10 µm, but may be up to several hundred µm. Such films, which may hereinafter be referred to as nanostructured films, typically possess a surface roughness of about 1000 assuming a thickness of about 10 µm. Surface roughness is defined as the true internal surface area divided by the projected area.

The basic concept of nanostructured thin films is described by B. O'Regan and M. Grätzel in Nature, 353, 737 (1991), and by Grätzel et al in J. Am. Chem. Soc., 115, 6382 (1993).

The application of nanostructured thin films in electrochromic devices is described by A. Hagfeldt, L. Walder and M. Grätzel in Proc. Soc. Photo-Opt. Intrum. Engn., 2531, 60 (1995), and by P. Bonhôte, E. Gogniat, F. Campus, L. Walder and M. Grätzel in Displays 20 (1999) 137-144.

In their article Bonhôte et al disclose an electrochromic system wherein a nanostructured electrode with a type n electrochromophore added to the surface is used in conjunction with a metal counter electrode (e.g. Zn) and ions of the same metal in the electrolyte. The charge needed for coloration of the nanostructured electrode is achieved by oxidation of the metal resulting in dissolution of metal ions and subsequent bleaching by redeposition of the metal. Long-term stability appears to be poor as prolonged cycling leads to metal particle and dendrite formation. It is also known that such electrochromic devices exhibit problems with bubble formation. This may be solved by a special chemical treatment that also adds requirements on the composition of the electrolyte. The unstable metal surface is further not a good substrate for additional films, e.g. a white reflector. Metal ions may also be deposited in the coloring electrode or in other locations in the display, causing unwanted irreversible blackening.

In WO9735227 (U.S. Pat. No. 6,067,184) P. Bonhôte et al lay forward several electrode-combinations for electrochromic devices comprising one or two nanostructured electrodes with electrochromophores added to the surface. In a first embodiment a nanostructured electrode with a type n electrochromophore added to the surface, is used in conjunction with a transparent material of polymeric type, which is oxidizable, colorless in the reduced state and, respectively, colorless or colored in the oxidized state. In another embodiment, both electrodes are nanostructured and have adsorbed molecules on the surface, type n electrochromophoric on the cathode and type p electrochromophoric on the anode, whereby a device with two coloring electrodes is achieved. A third proposed embodiment comprises a nanostructured coloring-electrode (anode) with adsorbed molecules on the surface (type p electrochromophoric), and a nanostructured counter electrode with no adsorbed molecules. In this device, the charge required for the coloration is counterbalanced by insertion of small cations into the nanostructured counter electrode In WO9835267 Fitzmaurice et al disclose that a nanostructured film, if used without the adsorbed redox chromophores, becomes colored on application of a potential sufficiently negative to accumulate electrons in the available trap and conduction band states. As a consequence of the high surface roughness of these films, ions are readily adsorbed/intercalated at the oxide surface permitting efficient charge compensation and rapid switching, i.e. the need for bulk intercalation is eliminated. However, Enright et al mentions that, despite the rapid switching times in such films, the associated change in transmittance is not sufficient for a commercial device. To overcome this limitation they propose that redox chromophores are adsorbed at the surface of the transparent nanostructured film, just as in the devices described above. This coloring electrode is then used in conjunction with an electrolyte containing ferrocene and a conducting glass counter electrode. Upon application of a voltage, reduction takes place at the coloring electrode and oxidation of ferrocene at the counter electrode. As reduced and oxidized species react internally, a permanent application of voltage is required to maintain the colored state i.e. there is no memory-effect. Naked electrodes, that is electrodes which does not have an redox active species added to the surface, have not been considered in previous displays with electrochromic capacitive electrodes, neither as non-colouring counter electrodes nor as counter electrodes, since naked electrodes has been considered to have too low charge capacity and colouration efficiency to be used in displays.

SUMMARY OF THE INVENTION

An object of the present invention is to provide an electrochromic device which, compared to prior art, exhibits rapid colour change, has a good memory effect, has improved stability, exhibits black colouration and which may be prepared using low cost processes.

These and other objects of the invention are achieved by the invention as defined in the independent claim 1. By arranging at least one of said first or second electrodes as a nanostructured conducting or semiconducting film, which does not have an redox active species added to the surface and furthermore arranging said at least one electrode together with the electrolyte for supporting a capacitive charge compensation between ions in the electrolyte and said at least one electrode, the change of state of the electrically active structure occurs without transfer of charge between the electrolyte and the electrodes and hence the time span for a colour change is reduced in comparison to electrodes only supporting intercalation processes for obtaining a colour change. Furthermore when using naked electrodes there are a less demand on designing the molecules for obtaining matching between energy levels of the redox active species and the electrode material. Furthermore the risk for deattachment of the redox active species at the electrode is eliminated by using naked electrodes. Furthermore the time consuming process of attaching redox active species in a bath is omitted.

Two different types of reactions may occur at an electrode in a electrochemic cell. In the first type of reaction a transfer of charge occurs between the electrolyte and the electrode. An example of this type of reaction is the reaction at a Zinc electrode in a battery. Zinc from the electrode is transferred to Zinc ions migrating to the electrolyte or vice versa. A current is flowing through the cell.

The other type of reaction is capacitive charge compensation which is defined as a charging of the interface between the electrode and the electrolyte by an accumulation of a quantity of positive and negative charge (electrons, ions holes, etc.) at either side of said interface. For example, accumulation of negative charges in the electrode is compensated by accumulation of positive charges in the electrolyte, or vice versa. Thus intercalation processes are excluded. The process does not involve any chemical reactions or structural transformation for the material involved. Further, there is no transport of charge from the electrolyte to the electrodes or vice versa. An example of a capacitive charge compensation is the reaction occurring at a porous carbon electrode. Electrons from a voltage source migrate in and out from the electrode material depending on the applied voltage, but are not transferred to the electrolyte. Instead the charge at the carbon electrode is balanced by ions in the electrolyte migrating towards or from a boundary layer surrounding the surfaces of the electrode. After charging the electrode there is no current flowing through the cell.

The definition of capacitive charge compensation used in this application also includes reactions where a transfer of charge exist between the electrode material and an eventually existing layer, of for instance electrochromophores, adhered to the electrode as long as there is no transfer of charge from the electrolyte to the electrode and/or the material covering the electrode. Furthermore we make no distinction between electrodes with internal charge transfer reactions from electrodes with no such internal charge transfer reactions. An electrode is capacitive if the electrode is due for interfacial charging meaning that the charging of metal oxide particles, attached molecules etc is compensated by opposite charging in the electrolyte.

In a first preferred embodiment of the invention the first electrode, second electrode and electrolyte of the electrochromic device supports capacitive charge compensation by including a first electrode (3) which comprises a nanostructured conducting or semiconducting film, which film has an electrochromophore added to the surface and a second electrode (5) which is a nanostructured conducting or semiconducting film, which does not have an redox active species added to the surface. In the first embodiment the electrically active structure is thus constituted by said an electrochromophore molecules added to the surface.

In a second preferred embodiment of the invention the first electrode, second electrode and electrolyte of the electrochromic device supports capacitive charge compensation by including a second electrode (5) which is a nanostructured conducting or semiconducting film, which does not have an electrochromophore added to the surface, and which film is electrically active having a dual state visual appearance depending on the potential difference between the first and the second electrode. In the second embodiment the electrically active structure is constituted by the film itself.

In a first embodiment of said second preferred embodiment a first electrode (3) is included, which first electrode is a nanostructured conducting or semiconducting film, which does not have an redox active species added to the surface.

In a second embodiment of said second preferred embodiment a first electrode (3) is included, which first electrode is either a non-capacitive electrode or a capacitive electrode having an electrochromophore added to the surface.

The redox active species are preferably constituted by electrochromophore molecules.

In a preferred embodiment the electrolyte is electrochemically inert. By providing an electrochemically inert electrolyte a good memory effect is obtained since the electrodes together with the electrolyte are capable of retaining a charged boundary layer surrounding the surfaces of the electrodes being in contact with the electrolyte after removing externally applied voltage source.

In order to ensure a short time span for a colour change the nanostructured conducting or semiconducting film at the second electrode (5) are formed with a roughness factor of at least 20.

Embodiments of the invention are defined in the dependent claims.

SHORT DESCRIPTION OF THE FIGURES

FIG. 1 shows a schematic picture of an electrochromic device according to the present invention

DETAILED DESCRIPTION OF PREFERRED EMBODIMENTS

An electrochromic device (FIG. 1), e.g. a window, comprises a first electrode 3 and a second electrode 5, out of which at least one becomes colored under reducing or oxidizing conditions. The electrodes 3,5 are separated by an electrolyte 4. Each of the two electrodes is typically supported by a conducting transparent plate 1, 7 or the like, e.g. a glass plate covered with a transparent conductive coating 2, 6, such as doped tin oxide. Furthermore, the conductive coatings 2, 6 are connected to an external electric circuit by means of contacts 8.

The electrochemical capacitance of a conducting (or semiconducting) surface in contact with an electrolyte is typically about 10 $\mu Fcm^{-2}$ to 40 $\mu Fcm^{-2}$ (the electrical double layer or Helmholtz capacitance). By using a nanostructured conducting film with a roughness factor of about 1000 (described more in detail below), it has been found that the total capacitance is raised to about 10 $mFcm^{-2}$ to 40 $mFcm^{-2}$ (the relationship between the roughness factor and the capacitance is proportional). This raise in capacitance makes it possible to use such a nanostructured film as an electrode in an electrochromic device, as it has the ability to provide the charge needed to color a coloring electrode in an electrochromic device, (which is in the range of 5 $mCcm^{-2}$ to 20 $mCcm^{-2}$).

Furthermore, since no intercalation is involved, such an electrode is "fast" enough to be used in any fast color switching electrochromic device In a nanostructured electrode it is essential that the particles are electrically connected with each other and the conducting substrate. They can be sintered together (heated), pressed together, chemically connected, connected with some kind of inorganic or organic binder particles in the film, etc. The porosity in the film must be high. Essential is that the pores in the film also form a 3-d network with nano-dimensions (1-100 nm pore size). This open porous structure makes the ion transport rapid when immersed in an electrolyte.

To improve the conductivity of electrons and ions in the film, the film may contain particles of larger size than nanoparticles. For example, micrometer-size ZnO rods that are grown from the substrate, as disclosed in WO 9800035-9 or graphite. In the same way the porous network may contain micron-size "pore channels" to speed up the ion transport. One could also imagine other additives, like light-scattering particles and the "binder particles" discussed above. Essential is that the main contact between the electrode and the electrolyte is located at the surface of the nanoparticles, and that this interface is easily accessible (e.g. not via long narrow pores within a particle) from the 3d-networks of both the particles and the pores.

Examples of suitable materials for such nanostructured conducting films are semiconducting metal oxides, carbon, metals and other semiconducting materials. A suitable semiconducting metal oxide may be an oxide of any suitable metal, such as, titanium, zirconium, hafnium, chromium, molybdenum, tungsten, vanadium, niobium, tantalum, silver, zinc, tin, strontium, iron, cobalt or nickel or a perovskite thereof.

The present inventors have discovered that certain semiconducting metal oxides (specified below), when prepared as nanostructured films with a roughness factor of at least 20, exhibit color-change characteristics that are not dependent upon intercalation of ions into the material. The main mechanism in these cases is instead capacitive charging (or double layer charging) at the surface of the nanostructured material. This capacitive behavior leads to much faster color switching, as there is essentially no intercalation involved.

For a nanostructured coloring electrode NiO (in the crystalline form bunsenite), CoO, $WO_3$ and $MoO_3$ are particularly preferred. Out of these, NiO and CoO become colored under oxidizing conditions and the others under reducing conditions. For a nanostructured non coloring electrode $TiO_2$, $In_2O_3$, $SnO_2$, $RuO_2$ and carbon are particularly preferred.

The electrolyte is preferably in liquid form and preferably comprises at least one electrochemically inert salt, either as a molten salt or dissolved in a solvent.

Suitable salts are composed of cations such as lithium, sodium, potassium, magnesium, tetraalkylammonium and dialkylimidazolium ions, and anions such as chloride, perchlorate, trifluoromethanesulfonate, bis(trifluoromethysulfonyl)amide, tetrafluoroborate and hexafluorophosphate ions.

Suitable solvents are electrochemically inert such as water, acetonitrile, methoxyacetonitrile, butyronitrile, propionitrile, 3-methoxypropionitrile, glutaronitrile, -butyrolactone, propylenecarbonate, ethylenecarbonate, dimethylsulfoxide, dimethylformamide, dimethylacetamide, and N-methyloxazolidinone, or mixtures thereof.

Suitable molten salts are e.g. dialkylimidazolium trifluoromethanesulfonate and dialkylimidazolium bis(trifluoromethysulfonyl)amide.

In one preferred embodiment, the first electrode 3 is a nanostructured electrode with a type n electrochromophore added to the surface. The second electrode 5 is a non-coloring electrode, comprising a nanostructured film of a conducting or semiconducting material as defined above. It should be noted that this second electrode 5 in this device does not have an adsorbed monolayer of electrochromophore or the like on the surface, whereby the production step of adding an electrochromophore to this electrode is omitted. Systems of this type utilize the fast color switching characteristics of the electrochromophore and the capacitive behavior of the nanostructured electrode. Such a system exhibits as fast color switching as the prior art systems based on electrochromophores, but has substantially better long-term stability (and cyclability). These improvements are due to the fact that no electrochemical reactions, other than (pseudo-) capacitive charging, are taking place at the counter electrode.

In another embodiment both the first electrode 3 and the second electrode 5 lack adsorbed monolayers of electrochromophores or the like on the surface. In this embodiment the second electrode 5 is a nanostructured coloring electrode of the type described above, i.e. a nanostructured NiO electrode or the like.

In a third embodiment both the first electrode 3 and the second electrode 5 are nanostructured coloring electrodes, i.e. one of the electrodes becomes colored under reducing conditions, and the other electrode becomes colored under oxidizing conditions.

As both electrodes in the last two embodiments lack adsorbed monolayers of electrochromophores or the like on the surface, production of such systems will be faster and less complicated. The adsorption of electrochromophores at the nanostructured electrode is a time consuming step in the fabrication of nanostructured electrochromic devices. The adsorption process may also negatively affect the properties of the electrode material. Such systems will further exhibit enhanced long-term stability since there are no intercalation or electrodepostion reactions at the electrodes and problems associated with desorption of electrochromophores are avoided.

By avoiding intercalation or electrodepostion reactions and adsorbed electrochromophores, one reduces the risk for competing destructive reactions (electrochemically and photo-induced). Supercapacitors with pure double-layer capacity are generally believed to have the highest electrochemical stability, in fact, electrochromic devices with two nanostructurednanoporous electrodes are "colouring supercapacitors".

Even though the color switch in the two last embodiments is not dependent upon intercalation, there will still exist intercalation to, some degree if small ions such as lithium ions are present in the electrolyte. One way to minimize the intercalation, which may slow down the color switch process, is to use an electrolyte that does not comprise such ions. Therefore, it is preferred to use an electrolyte that only comprises larger ions such as for example tetraalkylammonium ions.

The electrolyte thus supports capacitive charge compensation when capacitive charge compensation processes are dominant in relation to existing intercalation processes, in particular under change of colour of the electrode.

SPECIFIC EXAMPLE

An electrochromic display according to the invention may be provided as described in detail below.

Bis-(2-phosphonoethyl)-4,4'-bipyridinium dichloride is adsorbed to the surface of a 4 m thick nanostructured film of $TiO_2$ on a conducting glass plate (0.5 μm fluorine-doped $SnO_2$ on 2 mm glass). This electrode is transparent, but colours blue upon reduction. A nanostructured carbon film (10-50 μm thick), comprising carbon black and graphite particles, is deposited on a second conducting plate. On top of this film a porous white light-scattering film is deposited as a reflector. The two plates are assembled face-to-face using a hot-melting plastic at the uncovered edges of the two plates. Electrolyte (0.2 M tetrabutylammonium trifluoromethanesulfonate in 3-methoxypropionitrile) is introduced in the space between the two electrodes. The resulting electrochromic display has a good memory effect and stability (>100,000 cycles without severe degradation).

Above a number of embodiments have been described. However, it is obvious that the design could be varied without deviating from the inventive idea, of providing an improved electrochromic device.

Therefore the present invention should not be regarded as restricted to the above disclosed embodiments, but can be varied within the scope of the appended claims.

The invention claimed is:

1. An electrochromic device, comprising a first electrode, a second electrode and an electrolyte separating the electrodes,
    wherein said first electrode comprises an electrically active structure which has an at least dual state visual appearance depending on the potential difference between the first and the second electrode;
    wherein said second electrode comprises a nanostructured conducting or semiconducting film, which does not have a redox active species added to the surface; and
    wherein said second electrode together with the electrolyte are arranged for supporting a capacitive charge compensation by charging of an interface between said second electrode and the electrolyte by an accumulation of a quantity of positive and negative charges at either side of said interface.

2. An electrochromic device according to claim 1, wherein said electrolyte is an electrochemically inert electrolyte.

3. Electrochromic device according to claim 1 or 2, wherein said electrically active structure comprises a nanostructured film which has an electrochrmphore added to the surface.

4. Electrochromic device according to claim 3, wherein the film is transparent under reducing conditions and become colored under oxidizing conditions.

5. Electrochromic device according to claim 1, wherein the nanostructured conducting or semiconducting film at the second electrode has a roughness factor of at least 20.

6. Electrochromic device according claim 1, wherein the nanostructured conducting or semiconducting film at the second electrode is a nanostructured film of doped or undoped crystalline nickel or cobalt oxide or a mixture thereof.

7. Electrochromic device according to claim 1, wherein the nanostructured conducting or semiconducting film at the second electrode is comprised of carbon.

8. Electrochromic device according to claim 1, wherein the nanostructured conducting or semiconducting film at the second electrode is comprised of a metal.

9. Electrochromic device according to claim 1, wherein the nanostructured conducting or semiconducting film at the second electrode is comprised of a semiconducting metal oxide, selected from the group consisting of: an oxide of titanium, an oxide of zirconium, an oxide of hafnium, an oxide of chromium, an oxide of molybdenum, an oxide of tungsten, an oxide of vanadium, an oxide of niobium, an oxide of tantalum, an oxide of silver, an oxide of zinc, an oxide of tin, an oxide of strontium, an oxide of iron, an oxide of cobalt, an oxide of nickel and a perovskite thereof.

10. Electrochromic device according to claim 3, wherein the nanostructured film at the first electrode is transparent under oxidizing conditions and become colored under reducing conditions.

11. Electrochromic device according to claim 10, wherein the nanostructured conducting or semiconducting film at the second electrode is a nanostructured film of doped or undoped crystalline molybdenum or tungsten oxide or a mixture thereof.

12. Electrochromic device according to claim 10, wherein said capacitive charge compensation occurs between ions in the electrolyte and at said second electrode.

* * * * *